United States Patent [19]

Kobayashi et al.

[11] Patent Number: 5,092,680
[45] Date of Patent: Mar. 3, 1992

[54] DEVICE FOR MEASURING TEMPERATURE OF OBJECT IN VACUUM ENVIRONMENT

[75] Inventors: Kazuo Kobayashi, Ayase; Ayahiko Sato, Atsugi; Yuji Uehara, Kawasaki; Shigetomo Sawada, Isehara, all of Japan

[73] Assignee: Fujitsu Limited, Kawasaki, Japan

[21] Appl. No.: 527,307

[22] Filed: May 23, 1990

[30] Foreign Application Priority Data

May 23, 1989 [JP] Japan .................................. 1-127812
May 23, 1989 [JP] Japan .................................. 1-127813

[51] Int. Cl.$^5$ .............................................. G01J 5/08
[52] U.S. Cl. ..................................... 374/131; 374/130; 374/121; 356/44; 250/227.11; 385/141
[58] Field of Search ............... 374/121, 126, 129, 131, 374/132; 250/227.11, 347, 351; 350/96.34, 96.31; 356/44; 420/556

[56] References Cited

U.S. PATENT DOCUMENTS

| | | | |
|---|---|---|---|
| 3,354,720 | 11/1967 | Hagner | 374/132 |
| 3,666,949 | 5/1972 | De Falco et al. | 250/227.11 |
| 4,223,226 | 9/1980 | Quick et al. | 374/121 |
| 4,444,516 | 4/1984 | Dostoomian | 374/131 |
| 4,448,547 | 5/1984 | Wickersheim | 374/131 |
| 4,459,043 | 7/1984 | Luke | 374/130 |
| 4,632,127 | 12/1986 | Sterzer | 374/121 |

FOREIGN PATENT DOCUMENTS

| | | | |
|---|---|---|---|
| 0200311 | 11/1983 | Japan | 374/121 |
| 2045921 | 11/1980 | United Kingdom | 374/126 |

OTHER PUBLICATIONS

Japanese unexamined patent publication (Kokai) 01-107120 4/25/1989, pp. 103-108.

Primary Examiner—William A. Cuchlinski, Jr.
Assistant Examiner—Diego F. F. Gutierrez
Attorney, Agent, or Firm—Staas & Halsey

[57] ABSTRACT

A device for the measurement of a temperature in a relatively low range having the lower limit of below 100° C. is proposed. The device is suitably used for measuring a temperature of a substrate 4 during a sputtering treatment in a vacuum environment. Infrared rays radiated from the substrate 4 in a vacuum chamber 1 are collected by an optical lens 13 mounted in a freely movable probe 10 via a mirror (15) provided in a hood 14 attached to a front end of the probe (10) for deflecting the incident rays to the lens 13. The collected rays are led outside the chamber 1 to a sensor through a fluoride fiber 8 optically connected to the lens 13. The fiber 8 is enveloped in an air-tight manner within a metal bellows 9. A pipe 20, 24 for feeding a coolant extends in a circulating manner through the interior of the bellows 9 between a coolant source 30 and the probe 10, to suppress the radiation of infrared rays from the probe 10, hood 14 and mirror 15, and to reduce disturbance to the detected substrate temperature value. A combination of an MCT sensor composed of Hg, Cd and Te and a chalcogen fiber composed of Ge, As, Se and Te is also proposed for the measurement of relatively low temperature ranges. A system for controlling a substrate temperature during the sputtering process while using the above device is also proposed.

6 Claims, 14 Drawing Sheets

Fig. 8A MIRROR TEMP.

DEVICE FOR MEASURING TEMPERATURE OF OBJECT IN VACUUM ENVIRONMENT

BACKGROUND OF THE INVENTION

1. Field of the Invention

The present invention relates to a type of device for the measurement of a temperature of an object in a vacuum environment, by which infrared rays radiated from an object are collected and introduced to a sensor through an optical fiber. Particularly, it relates to a device of the above type by which a relatively low temperature range of from below 100° C. to several hundred centigrade can be measured.

2. Description of the Related Arts

The formation of a thin film formed on the surface of an object in a vacuum environment is now widely used in various fields, and the present invention is particularly applied to such a thin film formation process in a vacuum environment during for example, production of a magnetic disc, in which a surface temperature of a substrate must be controlled during the production process.

Figure 1:
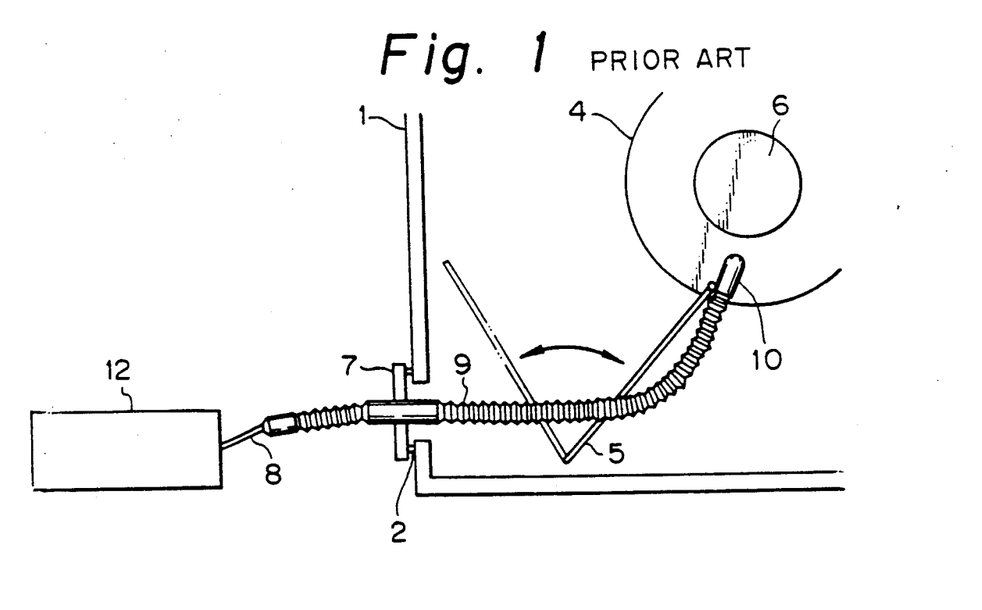
FIG. 1 is a schematic illustration of a prior art device for the measurement of a temperature in a vacuum environment.

FIG. 1 illustrates a structure of a prior art device of the above type proposed by the present inventors and disclosed in Japanese Unexamined Patent Publication (Kokai) 01-107120, published on Apr. 25, 1989. This device comprises a probe 10 freely movable by the manipulation of an arm 5, and a metal bellows 9 airtightly covering an optical fiber 8 (see FIG. 2) optically connecting the probe 10 to a sensor (not shown) incorporated in a measuring unit 12. The probe 10 is inserted to the interior of a vacuum chamber 1, in which a thin film formation is carried out on a disc-like substrate 4 rotatably supported by a shaft 6 of a holder, and the bellows 9 is extended from the measuring unit 12, positioned outside the chamber 1, to the probe 10 through an aperture in the side wall of the chamber 1. An airtight seal between the bellows 9 and the wall of the chamber 1 is ensured by a flange 7 and an O-ring 2.

Figure 2:
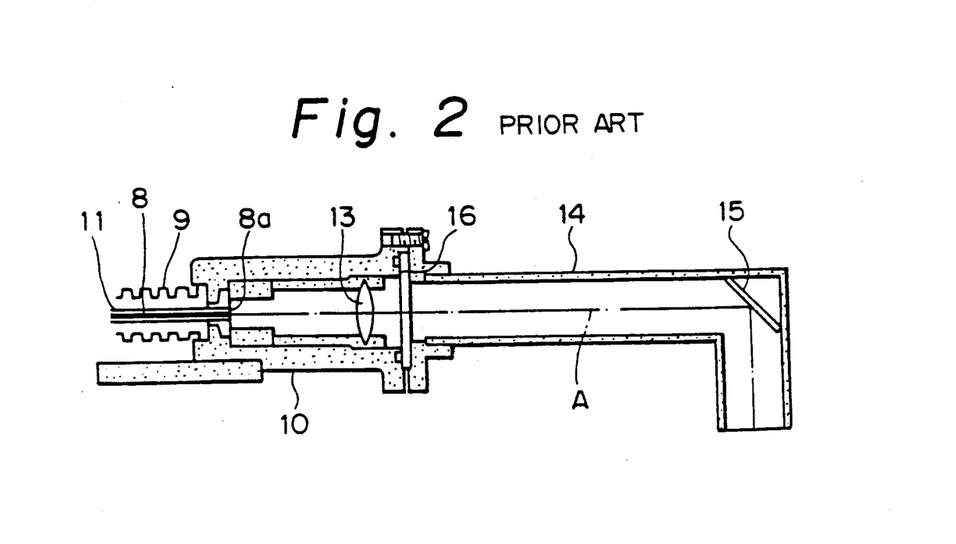
FIG. 2 is an enlarged sectional view of a probe portion of the device of FIG. 1.

As illustrated in FIG. 2, the optical fiber 8 is enveloped with a resin coating 11 and accommodated within the bellows 9. The probe 10 is provided with a lens 13 for converging infrared rays and a protective glass 16 for protecting the lens 13 from contamination. At the front end of the probe 10 is mounted an L-shaped hood 14 having a mirror 15 detachably fixed at an inner corner thereof, for deflecting infrared rays incident thereon to the lens 13, as shown by an optical axis A.

According to the above structure, the probe 10 catches infrared rays radiated from the substrate 4, and these rays are focussed by the lens 13 on to the open end 8a of the optical fiber 8, to collect a lot of rays and improve the sensitivity of the measurement. The infrared rays travel through the optical fiber 8 to the sensor in the measuring unit 12, and thus the temperature is detected as described later.

Because the hood 14 has an L-shaped configuration, flying particles generated during the thin film formation do not reach the protective glass 16 or lens 13 but are adhered to the mirror 15, which can be replaced when the contamination by the flying particles has an adverse affect on the reflectivity. In this regard, if the mirror surface is first coated with the same material as that of the metallic thin film, the deterioration of the reflectivity of the mirror due to the deposition of the flying particles is greatly suppressed.

Figure 3:
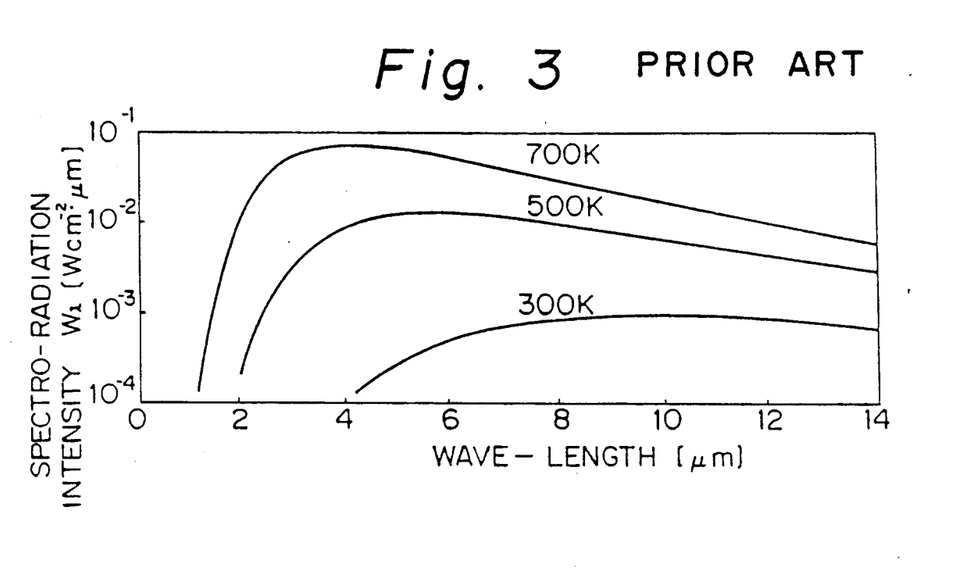
FIG. 3 is a curve illustrating a distribution of a spectro-radiation intensity of a perfect black body.

In the prior art temperature measurement device in which infrared rays radiated from an object to be measured are conducted through an optical fiber to a sensor, a combination of a quartz fiber and a photomultiplier or a Si-diode sensor, or a combination of a fluoride fiber and a PbS sensor, is well-known. The above combination of a fluoride fiber and a PbS sensor is used for measurements over a relatively low temperature range having a lower limit of about 120° C. The reason therefor is as follows:

A perfect black body has a distribution of a spectroradiation intensity as shown in FIG. 3, wherein the abscissa represents a wave-length ($\mu$m) and the ordinate represents a radiation intensity $W_\lambda(Wcm^{-2}\mu m^{-1})$. It will be understood that the lower the temperature of the object, the weaker the intensity of the ray radiated from the body and the greater the component of a longer wave-length. Accordingly, when the low temperature range is to be measured, it is necessary to elevate not only the transmittance of an optical fiber in the longer wave-length area but also the sensitivity of the sensor.

Figure 4:
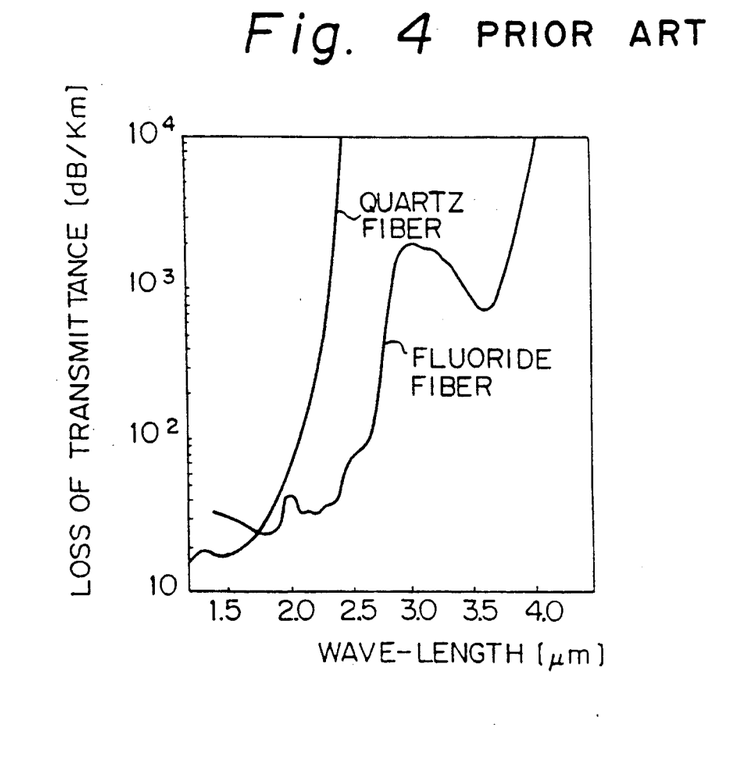
FIG. 4 is curves illustrating, respectively, a loss of transmittance characteristic of an optical fiber.

The losses of transmittance of a quartz fiber and a fluoride fiber ($ZrF_4$-$BaF_2$-$NaF_2$-$AlF_3$) are shown in FIG. 4, wherein the abscissa represents a wave-length ($\mu$m) and the ordinate represents a loss (dB/km). It will be apparent from the drawing that the quartz fiber does not permit the transmission of rays having a wave-length longer than 2.5 $\mu$m, but the fluoride fiber permits the transmission of rays having a wave-length up to about 4 $\mu$m. This is why the fluoride fiber can be used for the measurement of a relatively lower temperature as low as 120° C. The quartz fiber is exclusively used for the measurement of a relatively high temperature range of more than 400° C.

Figure 5:
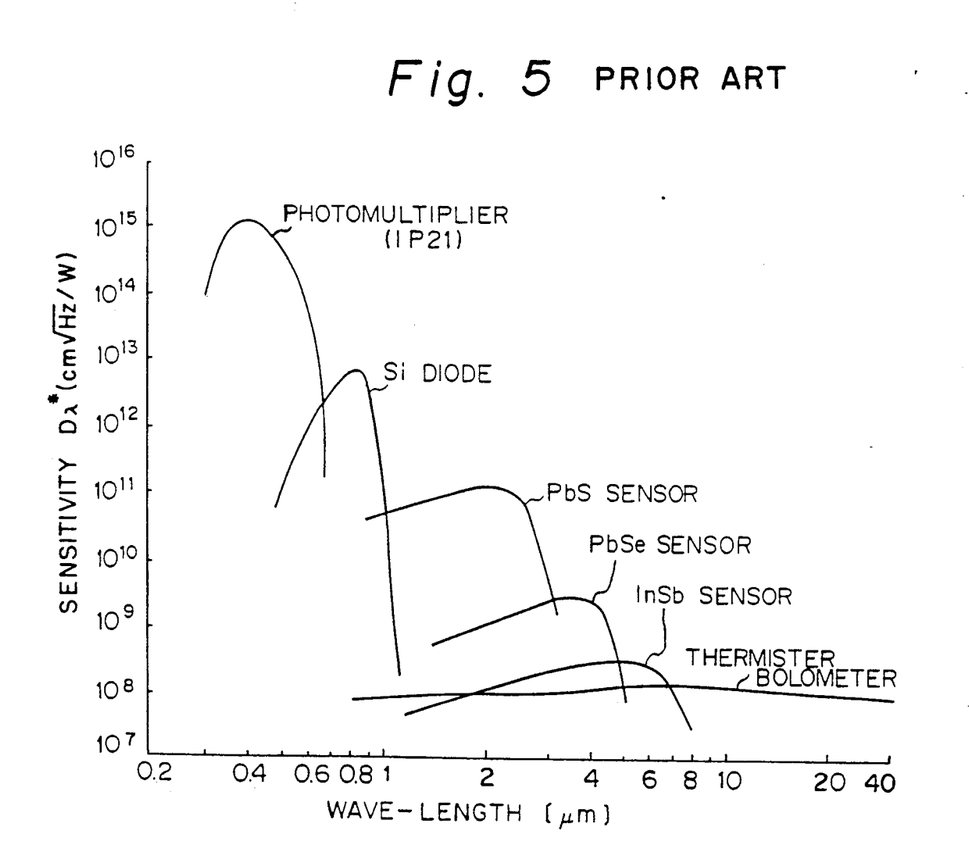
FIG. 5 shows curves illustrating, respectively, a sensitivity of a main infrared sensor element used for a thermometer operative in a room temperature.

FIG. 5 illustrates the sensitivity curves of the main sensors for the detection of infrared rays operative in the room temperature range, wherein the abscissa represents a wave-length ($\mu$m) and the ordinate represents a sensitivity $D_\lambda^*$. In a photomultiplier (IP21) and a Si-diode sensor, an effective wave-length range is that from visible rays to 0.9 $\mu$m, and in a Pbs sensor, the same is from 1.0 $\mu$m to 3.0 $\mu$m. Accordingly, the above combination of a fluoride fiber and PbS sensor is suitable for the measurement of a relatively low temperature range having a lower limit of about 120° C.

Figure 6:
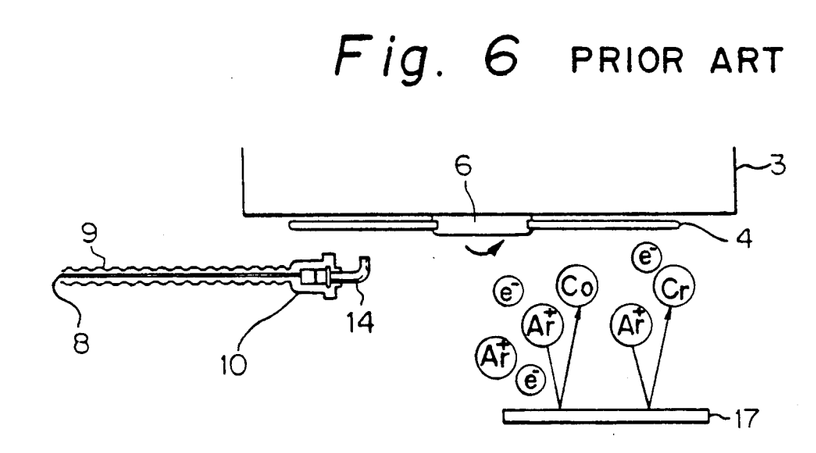
FIG. 6 is an illustration of a temperature measurement during a sputtering process.

The temperature measurement during a thin film formation by a sputtering process by the above-described device will be explained with reference to FIG. 6, as follows.

A CoCr target 17 is struck by a shower of Ar+ ions and emits Co and Cr atoms therefrom, which then are deposited on the surface of a substrate 4 for a magnetic disc to form a thin CoCr film thereon. During the sputtering process, the temperature of the probe 10 is elevated by the effect of plasma itself, as well as a temperature rise on the target surface, which leads to an erroneous measurement of the objective temperature of the substrate surface to be detected. Especially, the temperature rise on parts of the optical system such as the mirror 15, lens 13, and protective glass 16 has a serious influence on the temperature measurement.

The provision of a cooling system in an infrared thermometer for lowering a probe temperature is disclosed in U.S. Pat. No. 3,666,949. This, however, is not intended to reduce a disturbance in the detected temperature but to protect the probe itself from damage due to a high temperature environment caused by the welding process. In U.S. Pat. No. 4,459,043, a thermometer for detecting a temperature of the interior of a turbine engine is proposed, in which a coolant gas is introduced into a probe for quenching a mirror surface. This however, also is not intended to reduce a disturbance in the detected temperature but to prevent deterioration of the mirror surface. This is because these thermometers are adapted to detect a temperature range of around 1000° C., which means that the objective temperature to be measured is so much higher than that of the probe that infrared rays radiated from the probe itself do not influence the result of the measurement.

Contrary thereto, the present inventors found through experiments that, in the thin film formation process in a vacuum environment in which the surface temperature of the substrate is in a temperature range of from the room temperature to 400° C., the radiation of infrared rays from the probe itself has a significant influence on the detected temperature.

SUMMARY OF THE INVENTION

Accordingly, an object of the present invention is to provide a device for the measurement of the surface temperature of an object in a vacuum environment such as for a thin film formation by a sputtering method, in which a disturbance due to infrared rays radiated from the probe itself can be suppressed to ensure a correct temperature measurement.

Another object of the present invention is to provide a novel combination of an optical fiber and a sensor suitable for the measurement of a relatively low temperature range with the lower limit of below 100° C.

The above objects can be achieved by a device for the measurement of a temperature of an object in a vacuum environment, by which infrared rays radiated from the object present in a vacuum chamber are collected by an optical lens mounted in a freely movable probe via a mirror provided in a hood attached to a front end of the probe, which mirror is secured upstream of the lens with regard to direction of incidence of the infrared rays for deflecting the incident rays to the lens, the collected rays being led outside the chamber to a sensor through an optical fiber following the lens, said optical fiber being enveloped in an air-tight manner within a metal bellows; wherein a pipe for feeding a coolant is extended in a circulating manner through the interior of said bellows between a coolant source present outside the chamber and the probe to suppress the radiation of infrared rays from the probe portion and reduce the disturbance caused thereby to the detected objective temperature value.

Preferably, the optical fiber used in the device according to the present invention is a chalcogen fiber composed of Ge, As, Se and Te, and preferably the sensor is an MCT element composed of Hg, Cd and Te, an InSb element or a PbSe element.

According to another aspect of the present invention, a thin film formation system in a vacuum environment by a sputtering or vapor deposition is provided, in which target or a vapor source is energized to emit particles therefrom and deposit the same on the substrate surface to form a thin metallic film, comprising the steps of; detecting a temperature of the substrate surface by the above temperature measurement device, and controlling the power supply for energizing the target or vapour source through a feedback of the detected temperature so that the substrate temperature is maintained in a predetermined range during the thin film formation.

BRIEF DESCRIPTION OF THE DRAWINGS

The present invention will be explained in more detail with reference to the preferred embodiments illustrated in the drawings; wherein.

DESCRIPTION OF THE PREFERRED EMBODIMENTS

Figure 7A:
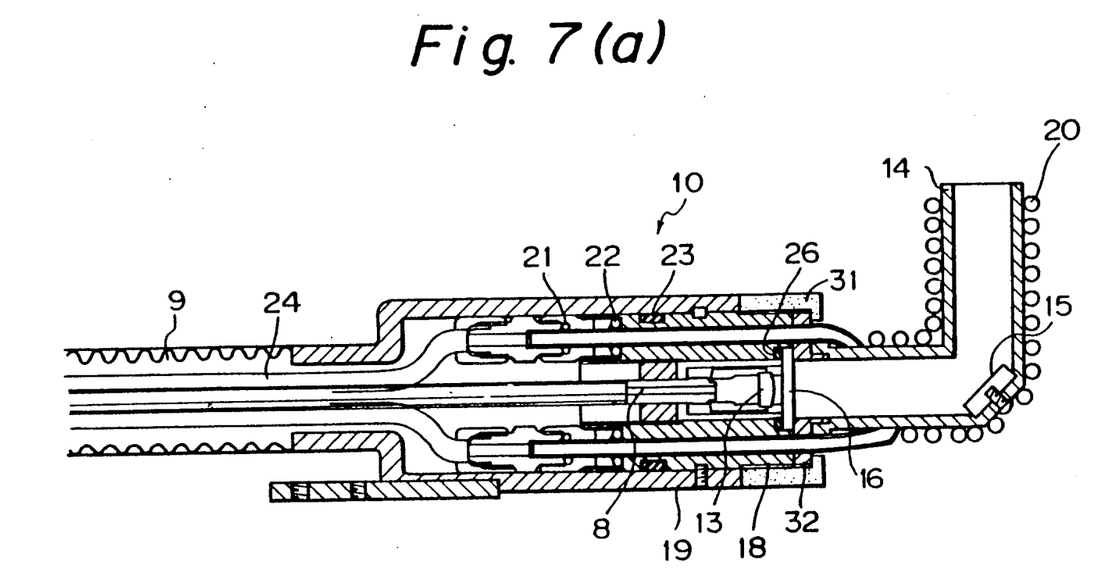
FIG. 7(a), (b) and 7(c) are a sectional views of a probe portion of a temperature measurement device according to the present invention.
Figure 10:
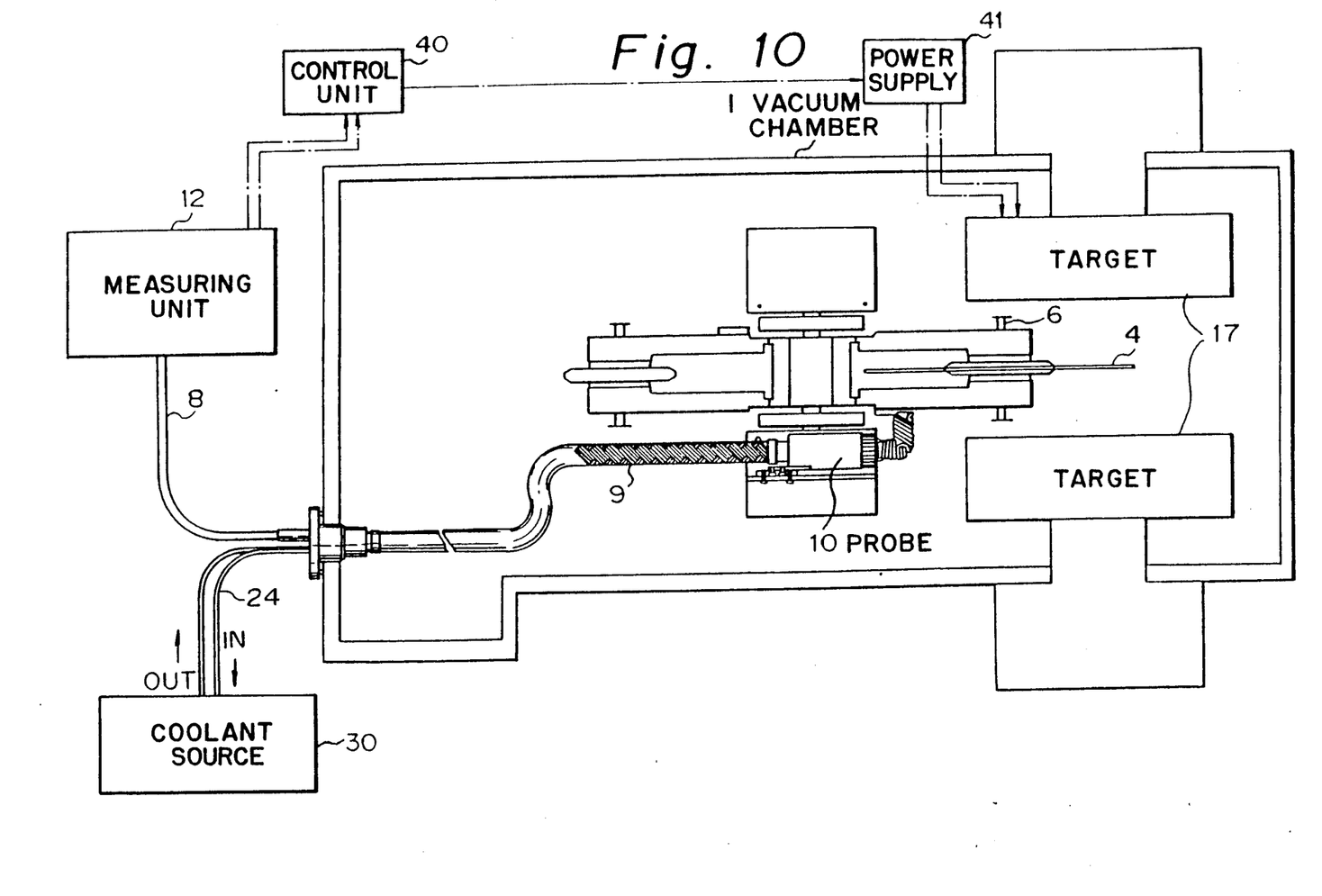
FIG. 10 is an illustration of a thin film formation system by sputtering, to which the present invention is applied.

A device for the measurement of a temperature of an object in a vacuum environment according to the present invention has substantially the same structure as that illustrated in FIG. 1 and 2, except for the provision of a novel cooling system as shown in FIGS. 7(a) and 10. Accordingly, an explanation of the structure other than the cooling system will be omitted.

A flexible coolant pipe 24 extends from a coolant source 30 to a probe 10, through the interior of a bellows 9, together with an optical fiber 8 extending from a measuring unit 12. The flexible pipe 24 is air-tightly connected to an end of a cooling coil 20 projected into the interior of the probe 10 through the front wall thereof. The cooling coil 20 is wound around the entire periphery of a hood 14 accommodating a mirror 15. The cooling coil 20 is attached to the hood wall by welding or hard soldering, and arranged so that the each winding is in contact with the adjacent winding. This tight arrangement is achieved by winding the coil 20 in a double-fold manner. The pipe 24 also forms a return path to the coolant source 30 so that a coolant, such as water or organic solvent in the coolant source 30, can endlessly circulate through the pipe 24 and the coil 20.

Figure 7B:
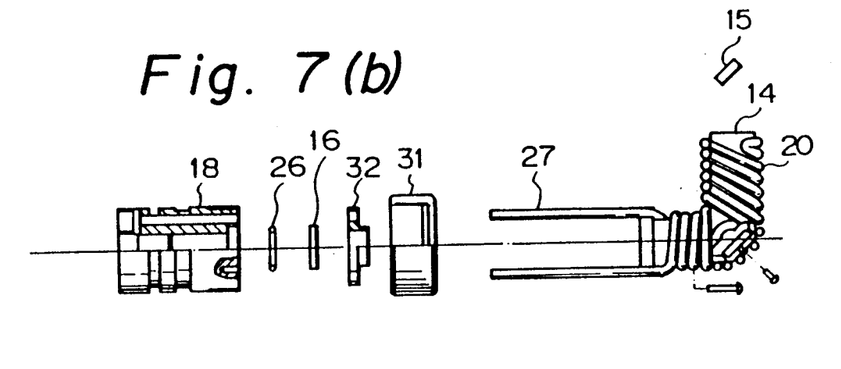
Figure 7C:
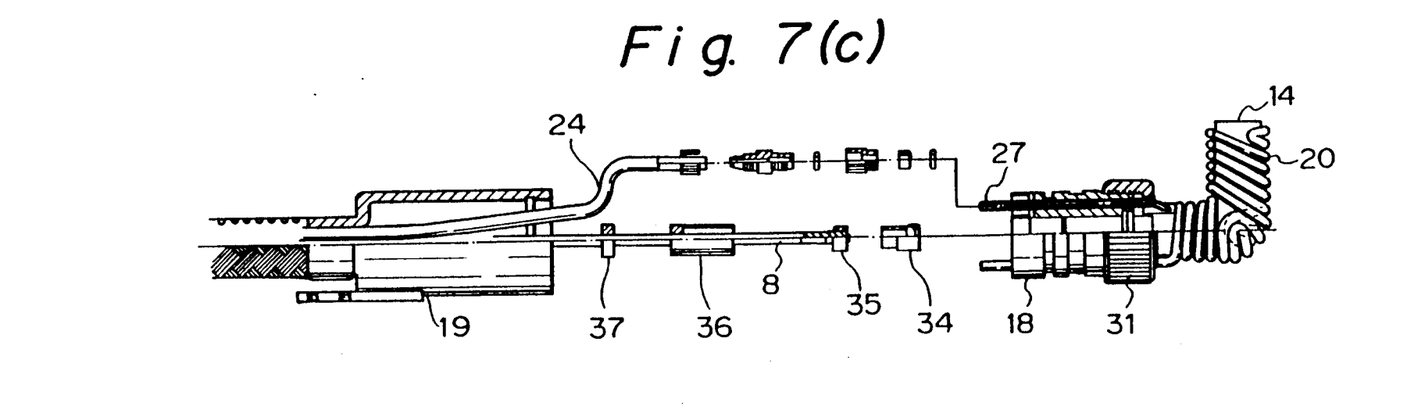

As shown in FIG. 7(b), the assembly of a probe portion of this device is carried out, after the coil 20 has been fixed to the hood 14, by inserting the respective straight end portions 27 of the cooling coil 20 into a cap 31 and an intermediate ring 32, mounting the protective glass 16 and an O-ring 26, and applying a cylindrical lens housing 18 to hold the protective glass 16 and the O-ring 26 in place. Thereafter, as shown in FIG. 7(c), a lens unit 34 mounting a lens 13 is inserted in the housing 18. An element 35 fixed on the end of the optical fiber 8 and a lens holder 36 are subsequently applied to the lens unit 34 prior to attaching a nut 37 for fixing the same. Finally, a probe casing 19 is applied to complete the total structure of the probe.

The air-tightness of the probe portion is ensured by O-rings 21, 22, 23 and 26, as shown in FIG. 7(a).

In the preferred embodiment, the cooling coil 20 and the hood 14 are made of copper, because of the good thermal conductivity thereof. The mirror 15 is formed by a polished aluminum plate and the bellows 9 is flexibly formed by a stainless steel tube. The probe casing 19 and the cylindrical lens housing 18 accommodated within the former are made of stainless steel. The optical fiber 8 is made of fluoride having a loss characteristic relative to a wave-length, as shown in FIG. 4.

As described with reference to FIG. 1, infrared rays radiated from an object on which the temperature measurement is carried out is reflected by the mirror 15, and then passes, via the protective glass 16, through the lens 13 and is focussed onto an open end of the optical fiber 8. Then the rays are introduced in the sensor mounted in the measurement unit 12, in which the substrate temperature is detected in a well-known manner.

During the temperature measurement, the probe and hood are quenched so that they are not heated to a level at which they are liable to radiate infrared rays which will disturb the objective temperature. Especially, the quenching of the mirror 15 is important because the infrared rays radiated from the mirror surface itself are directly introduced to the lens and reach the sensor, and thus disturb the measurement of the objective temperature.

The effects of the mirror quenching will be described theoretically in more detail as follows:

The amounts W of infrared rays radiated from the mirror surface and the objective surface are expressed by an equation proposed by Planck $$W(\lambda,T) = 2\pi hc^2/\lambda^5 [(\exp hc/\lambda kT) - 1]$$

wherein $\lambda$ is a wave-length of infrared rays, h is a Planck's constant, c is a light velocity, and k is a Boltzmann's contant.

Figure 8A:
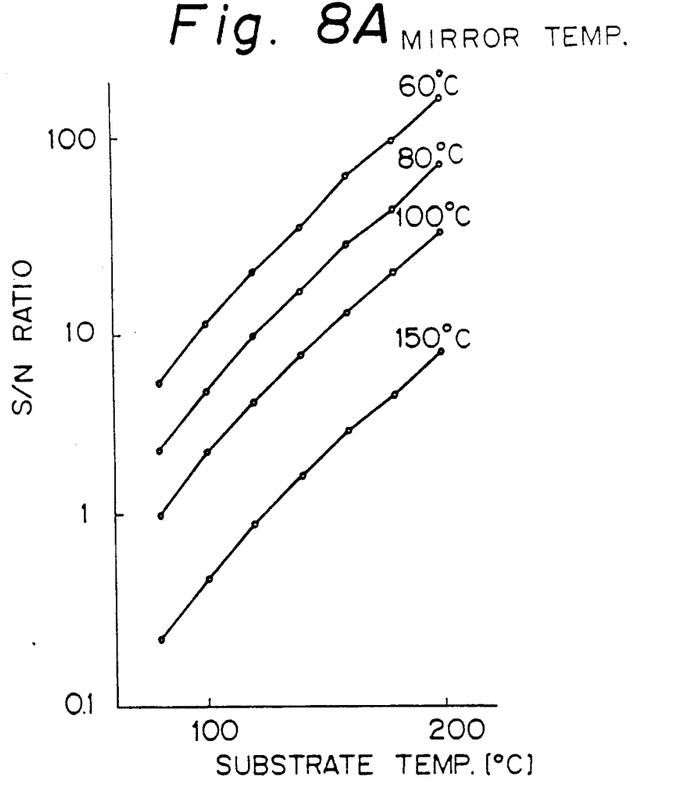
FIGS. 8a and 8b show graphs illustrating, respectively, the estimation of the theoretic effects on the temperature measurement due to the cooling of a mirror.
Figure 8B:
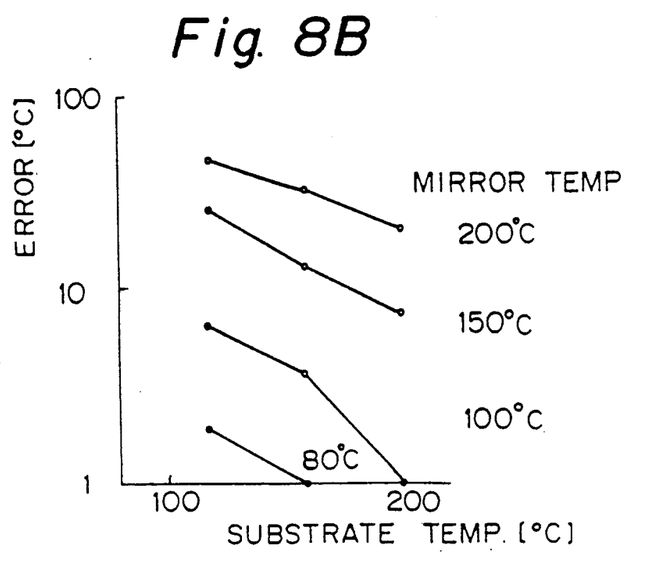

FIGS. 8A and 8B illustrate the calculated results of the improvement in a S/N ratio regarding infrared rays having 3 μm wave-length and in the measurement error due to the mirror temperature. Here the emissivities of the aluminum mirror surface and the objective surface coated with NiP base film are assumed as 0.1 and 0.22, respectively. It will be apparent that the S/N ratio is improved to be more than 10 and the temperature error is reduced to be within 2° C., by keeping the mirror temperature below 80° C. when the temperature of objective surface is above 120° C.

The same is also true of the lens and the protective glass, which are quenched by the cooling system according to the present invention.

Figure 12:
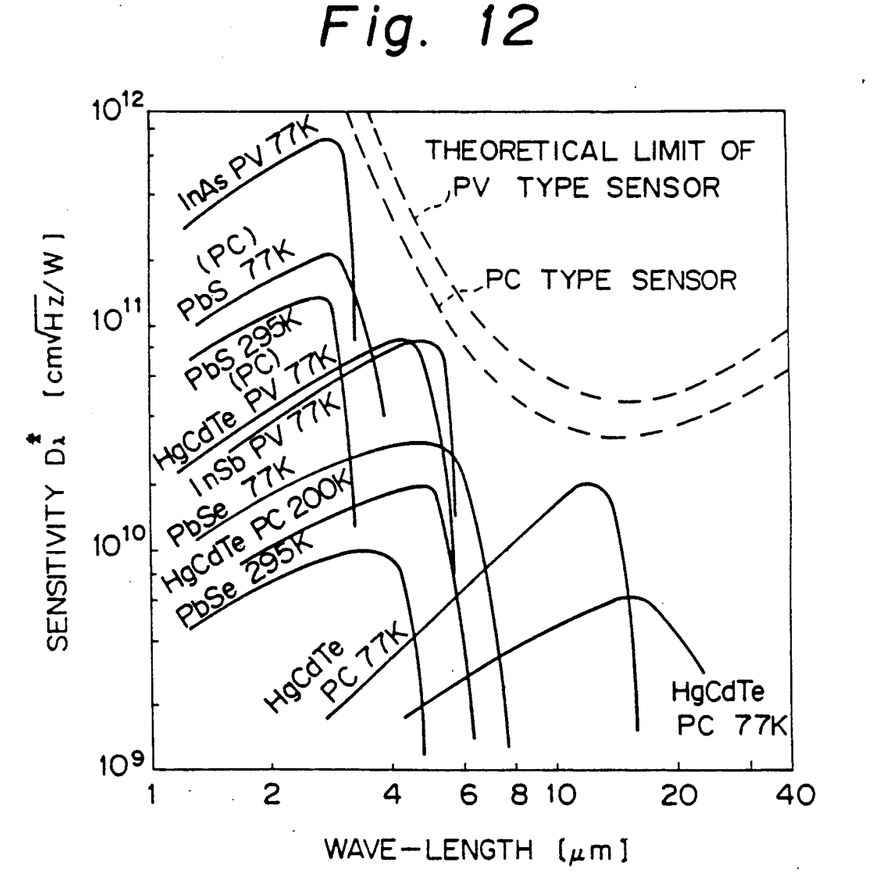
FIG. 12 shows graphs illustrating, respectively, a sensitivity of a sensor for detecting infrared rays.

FIG. 12 illustrates spectro-sensitivities $D_\lambda^*$ of various infrared sensors operative in a range of above the liquid nitrogen temperature, wherein the abscissa represents a wave-length and the coordinate represents $D_\lambda^*$ (cm·H$^{\frac{1}{2}}$/w).

As described hereinbefore, in a lower temperature range, infrared rays should be detected in a longer wave-length range. For the temperature measurement according to the present invention, i.e. in a relatively low temperature range having the lower limit of below 100° C., it is necessary to select a combination of an infrared sensor and an optical fiber effective in a wave-length range of from 5 to 10 μm. The criteria for this selection are as follows:

Sensor Suitable for the Measurement of Low Temperature Range

In FIG. 12, two dotted lines represent a theoretical limit of PV (photovoltaic)-type sensor and of a PC (photoconductive)-type sensor, respectively, when the field of view is 2π steradian and the background temperature is 295° K. The spectro-sensitivity is an S/N ratio standardized by an incidental power, a range of wave-length treatable by a measurement system, and an area of a sensitive part of the sensor element. It will be apparent from the drawing that InAs, PbS, InSb and PbSe sensors have a higher sensitivity in a wave-length range of up to 4 μm, while an MCT (HgCdTe) sensor has a higher sensitivity in a wave-length range above 5 μm.

Figure 13:
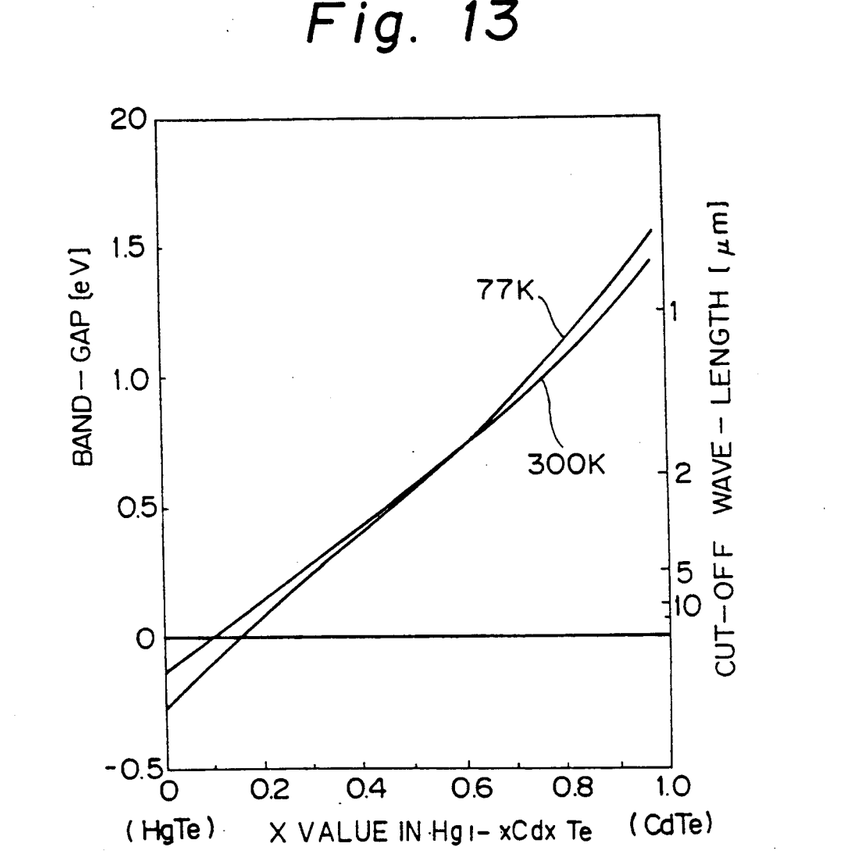
FIG. 13 shows graphs illustrating, respectively, a relationship between a mol ratio between components of a MTC sensor element and a band gap or a cut-off wavelength.

A longer side wave-length at which $D_\lambda^*$ is reduced to half a peak value is referred to as a "cut-off wavelength". The transition of the cut-off wave-length in accordance with a ratio between Hg and Cd in an MCT sensor is shown in the graphs of FIG. 13, wherein the abscissa represents a mol ratio of CdTe component in $Hg_{1-x}Cd_xTe$, the lefthand coordinate represents a band-gap (eV), and the righthand coordinate represents a cut-off wave-length. From these graphs, it will be understood that an amount of Hg should be increased if an MCT sensor with a high sensitivity in the longer wave-length range is required.

Optical Fiber Suitable for the Measurement of Low Temperature Range

Figure 14:
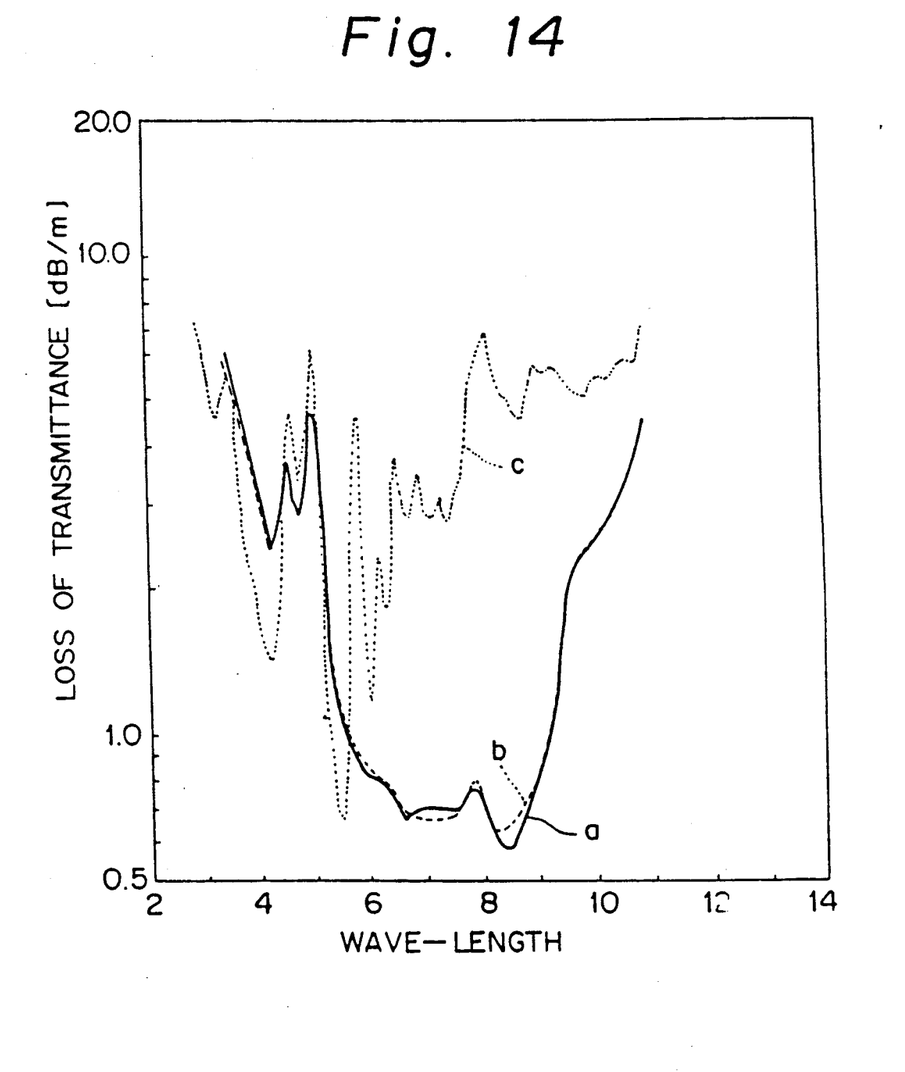
FIG. 14 shows graphs illustrating, respectively, a loss of transmittance in a chalcogen fiber.

A chalcogen fiber has been known as a fiber having a good transmittance to infrared rays in a wave-length range of from 5 μm to 10 μm (J. Nishi et al.: Appl. Phys. Lett. 53(7), 15 Aug. (1988) 533). This fiber is composed of GeAsTe, and has characteristic curves of a transmittance loss (dB/m) relative to a wave-length as shown in FIG. 14, wherein a curve (a) is obtained with a fiber having a core of $Ge_{25}As_{20}Se_{25}Te_{30}$ and clad-coated with $Ge_{20}As_{30}Se_{30}Te_{20}$ via a UV curable polymer, a curve (b) is obtained with a fiber having a bare core of $Ge_{25}As_{20}Se_{25}Te_{30}$ and a curve (c) is obtained with a fiber having a core of $Ge_{25}As_{20}Se_{25}Te_{30}$ and coated with a UV curable polymer. The characteristics are slightly different from each other in accordance with a ratio between Ge, As, Se and Te. This suggests the possibility of a selection of an optimum fiber matching a temperature range to be detected and a characteristic of a sensor to be used. The length of the optical fiber required for the present device is at most 2 m, which means that the loss of a 3 dB/m order has no problems in practical use.

As stated above, a detectable temperature range can be lowered by the use of a combination of an MCT sensor element and a chalcogen fiber in the thermometer of the type described.

The effect of the present invention will be made more apparent by the following examples of the temperature measurement:

EXAMPLE 1

There have been no reports of the temperature measurement during the sputtering process, but the present inventors contemplated carrying out such the measurement of a substrate temperature by using the device according to the present invention illustrated in FIGS. 7 and 10.

In this device, a PbS sensor accommodated in a measuring unit 12 was used as an infrared sensor. A fluoride fiber was combined therewith for introducing the infrared rays into the sensor.

Figure 15:
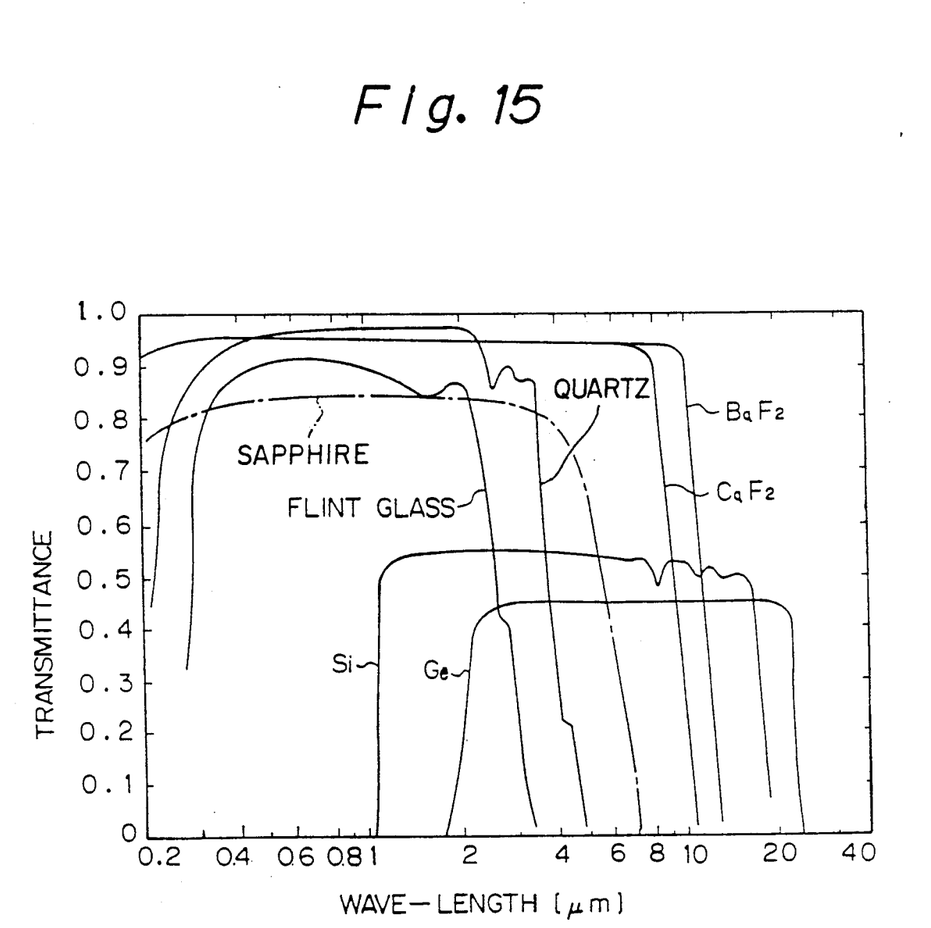
FIG. 15 is graphs illustrating, respectively, a transmittance of material for forming a lens and a protective glass.

A lens and a protective glass were formed of sapphire, because of its excellent transmittance for longer wave-length rays, as shown in FIG. 15, in which the transmittances of various sheet materials of 1 mm thickness are plotted relative to wave-length. In this connection, sapphire may be replaced by quartz for the temperature range of this example. Also, it will be apparent from the drawing that, if the temperature measurement in an even lower range is required, $BaF_2$ or $CaF_2$ is more preferable.

A glass disc 5 in (127 mm) diameter was used as a substrate after a base layer of 5 $\mu$m thickness NiFe was preliminarily coated. CoCr including 20 atomic % of Cr was used as a target for forming a thin film of a perpendicular magnetic recording medium. A DC sputtering process was carried out at a 4 KW power under conditions of an Argon gas pressure of $5 \times 10^{-3}$ Torr and an electrode distance of 122 mm. The substrate was preliminarily heated at 194° C. by a heater incorporated in a substrate holder and rotated at 2 rpm.

Figure 9:
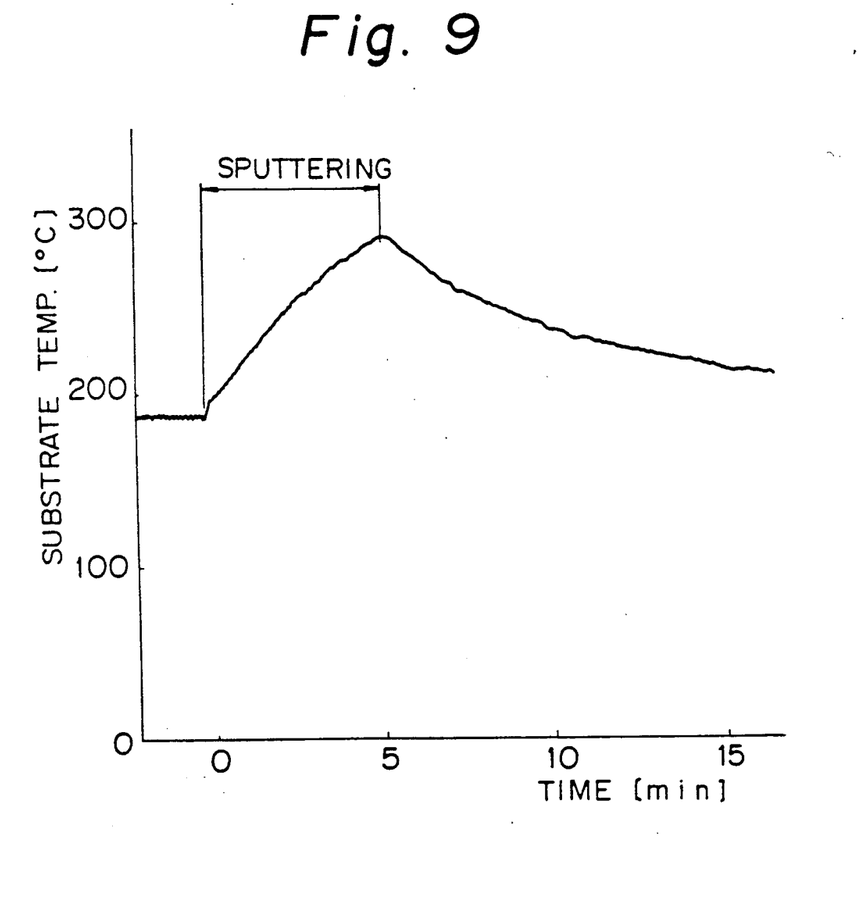
FIG. 9 is an example of a transition of the substrate temperature during a sputtering treatment detected by a device according to the present invention.

A transition of the substrate temperature measured through infrared rays radiated from the substrate is illustrated in a graph of FIG. 9, wherein the abscissa represents a time (min) and the coordinate represents a detected substrate temperature (°C.). The substrate temperature reached a peak value of about 300° C. after the sputtering was continued for about 5 min. The temperature rise from the initial condition was about 100° C. When the sputtering was interrupted, the temperature was gradually lowered.

The probe was cooled during the sputtering with water at 100 cc/min. Thus, the temperature rise of the probe was at most 2° or 3° C., according to a measurement by a thermocouple. This is a negligible value and thus it can be considered that the substrate temperature measured through infrared radiation represents a true substrate temperature.

Contamination of the aluminum mirror surface due to particles ejected from the target did not occur.

According to the preliminary measurement of the infrared emissivity according to the present device, since both the NiFe base layer and the formed CoCr film have the same value of 0.25, it was unnecessary in this example to change the set value for the measurement based on the emissivity. Nevertheless, if a base layer or a bare surface of the substrate has a different emissivity from that of the formed film, the set value should be adjusted in accordance with the transition of the emissitivity as the formation of the thin film progresses.

EXAMPLE 2

A longer term measurement was carried out with the same measuring device as in Example 1 in a production process on 20 successive disc substrates, respectively, subjected to a sputtering treatment for 2 min., in which $\alpha$-$Fe_2O_3$ magnetic film is formed on the respective aluminum disc of 10.5 in (267 mm) diameter under the condition of 7 KW power and an Argon gas pressure of $5 \times 10^{-3}$ Torr.

Figure 11:
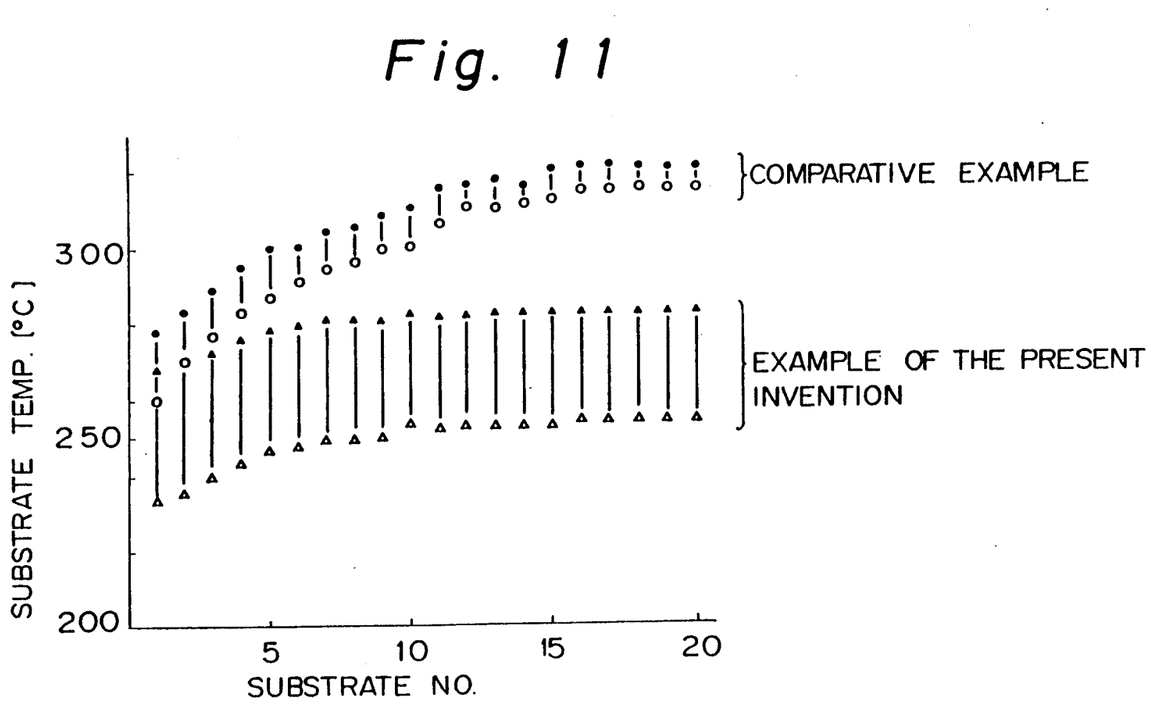
FIG. 11 is an example of a transition of the temperature measured on successive substrates treated in the sputtering process.

The results are plotted in the graphs of FIG. 11, wherein lower pairs of black and white triangles represent the results of the present inventive example in which the cooling system with a cooling water at 135 cc/min was operated, while upper pairs of black and white circles represent a comparative example in which the cooling system was not operated. In the respective pairs, the white mark designates an initial temperature and the black mark designates a final temperature.

In the example, the substrate temperature is kept substantially constant even though the number of substrates increases. Conversely, in the comparative example, the substrate temperature is considerably increased as the numbers of the treated substrate is increased. This means that the probe temperature became so high in the comparative example that disturbance radiation was generated therefrom to cause an erroneous measurement of the substrate temperature.

The present invention also includes a system for controlling a substrate temperature in a thin film formation process with the abovesaid temperature measurement device. Control of the substrate temperature is very important in the sputtering process, because the film quality largely depends on the substrate temperature. Accordingly, the substrate temperature should be maintained in a predetermined range.

The substrate temperature is mainly influenced by the degree of energization of a target. If the target is energized at a higher level, the substrate is also energized by atoms emitted from the target. Therefore, according to the present invention, as shown by a chain line in FIG. 10, a signal representing the detected substrate temperature is fed to a control unit 40, and the signal is compared therein with a reference value representing the preset aimed substrate temperature. If the difference exists therebetween, a control signal is output from the control unit 40 to a power supply means 41 to adjust an energization degree of the target 17 in a feedback manner. According to the control of the target, the substrate temperature can be maintained in a predetermined required range.

As stated above, according to the present invention, a probe portion including a hood, mirror a protective glass and a lens is quenched by a cooling system during a temperature measurement, so that infrared rays radiated from a point other than an objective surface to be measured are sufficiently suppressed, to provide a highly accurate temperature measurement.

It is considered that a temperature measurement of a substrate is now possible, according to the present invention, for the first time, while the substrate is subjected to a sputtering process, even though a sputtering power is high or a heat source is close to a probe.

A combination of chalcogen fiber and an MCT sensor element enables the measurement of an objective temperature in a relatively lower range.

We claim:

1. A device for the measurement of a temperature of an object in a vacuum environment, in which infrared rays radiated from the object present in a vacuum chamber are collected by an optical lens mounted in a freely movable probe via a mirror provided in a hood attached to a front end of the probe, which mirror is secured upstream of the lens with regard to the direction of incidence of the infrared rays for deflecting the incident rays to the lens, the collected rays being led outside the chamber to a sensor through an optical fiber following the lens, said optical fiber being enveloped in an airtight manner within a metal bellows;

wherein a pipe for feeding a coolant extends in a circulating manner through the interior of said bellows between a coolant source present outside the chamber and the probe to suppress the radiation of infrared rays from the probe portion and reduce disturbances caused thereby to the detected objective temperature value, and wherein said optical fiber is a chalcogen fiber composed of Ge, As, Se and Te, and said sensor is an MCT element composed of Hg, Cd and Te.

2. A device as defined by claim 1, wherein said coolant pipe has a coil portion wound around the periphery of said hood and welded or hard soldered thereto.

3. A device as defined in claim 1, wherein said hood is L-shaped and said mirror is provided at a curved inner corner thereof.

4. A device as defined by claim 3, wherein said mirror is detachably mounted to said hood.

5. A device as defined by claim 1,
wherein the object is a substrate having a surface, said
wherein a surface of said mirror is preliminarily coated by a layer of the same metal as that of a thin film to be formed on the surface of the substrate.

6. A device for the measurement of a temperature of an object in a vacuum environment, in which infrared rays radiated from the object present in a vacuum chamber are collected by an optical lens mounted in a freely movable probe via a mirror provided in a hood attached to a front end of the probe, which mirror is secured upstream of the lens with regard to the direction of incidence of the infrared rays for deflecting the incident rays to the lens, the collected rays being led outside the chamber to a sensor through an optical fiber following the lens, said optical fiber being enveloped in an airtight manner within a metal bellows, wherein a pipe for feeding a coolant extends in a circulating manner through the interior of said bellows between a coolant source present outside the chamber and the probe to suppress the radiation of infrared rays from the probe portion and reduce disturbances caused thereby to the detected object temperature value, wherein the object is a substrate having a surface, and wherein a surface of said mirror is preliminarily coated by a layer of the same metal as that of a thin film to be formed on the surface of the substrate.

* * * * *